May 12, 1942. W. F. SERR 2,283,019
EGG COOKER
Filed May 29, 1940

INVENTOR
William F. Serr
BY: Albert M. Austin
ATTORNEY

Patented May 12, 1942

2,283,019

UNITED STATES PATENT OFFICE 2,283,019

EGG COOKER

William F. Serr, New York, N. Y., assignor to Eric Pusinelli, New York, N. Y.

Application May 29, 1940, Serial No. 337,750

2 Claims. (Cl. 53—1)

This invention relates to egg cookers and more particularly to a cooker including an individual egg cup adapted for cooperation with a liquid-containing vessel for the steam cooking of eggs.

Various types of egg cookers have been developed, among which are poachers for immersing the egg in boiling water and including either a single cup adapted to fit an individual water-containing vessel of comparable size, or cookers including a plurality of individual cups supported on a rack or like device in a larger receptacle.

Cookers of the prior art type, adapted to immerse the egg or eggs in boiling water, are not suitable for cooking the eggs simultaneously with other foods in the same vessel. In the case where a rack with a plurality of individual cups is employed, the device is relatively expensive and inconvenient to handle.

In accordance with the present invention, an individual egg cup is provided which is adapted to hookingly engage over the rim of a vessel of suitable size, independently of any supporting means other than the side walls of the vessel itself. Any desired number of individual cups, up to the capacity of the vessel, can thus be employed, the cups being adapted for insertion and removal individually and each provided with a handle of such construction that the danger of burns to the person using the cup is minimized.

In one preferred construction, the element has a relatively shallow cup with a flat periphery and from one side of the periphery there extends upwardly a lip or clip inclined slightly away from the axis of the cup which will permit the lower portion of said cup together with the lip to suspend the poaching cup in position on the inclined or vertical side of a pan or pot, as the case may be.

The far end of the lip or clip member is provided with a further extension preferably in the plane of the rim of the cup which extension is provided with perforation and preferably with a ridged or grooved portion extending around the perforation.

An object of the present invention is the provision of an improved egg cooking device which can be inexpensively manufactured of durable material at low cost and which does not require a cooperating receptacle of special construction but can be employed with any of innumerable different sizes and types of kitchen receptacles or vessels.

Another object of the invention is the provision of an improved egg cooking cup which can be employed with any one of a number of shaped and dimensioned receptacles either singly or with a plurality of other cups and which can be placed upon a tray, rack or other plate for serving purposes.

Various other features and advantages of the invention will be apparent from the following particular description and from an inspection of the accompanying drawing.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part hereof, in which Fig. 1 is a top plan view of one form of egg cooking cup formed in accordance with the invention;

Figure 1:
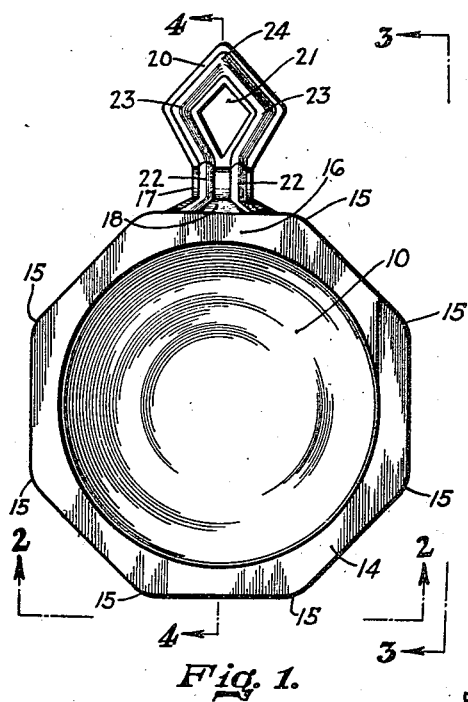
Figure 2:
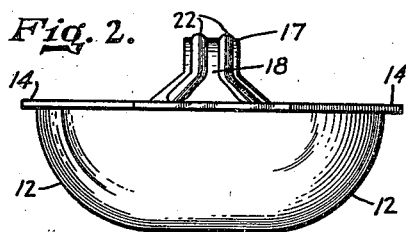
Fig. 2 is an elevational view of the cup shown in Fig. 1, taken along the line 2—2 of Fig. 1.
Figure 3:
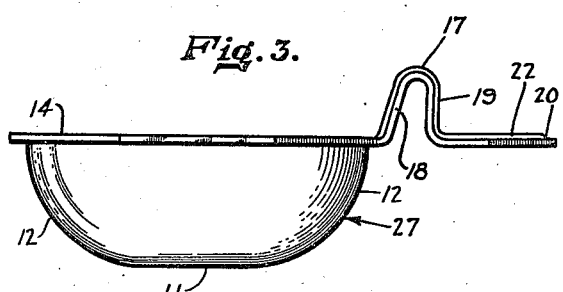
Fig. 3 is an elevational view of the cup in Fig. 1, taken along the line 3—3 of Fig. 1.

In the following description and in the claims, various details will be identified by specific names for convenience, but they are intended to be as generic in their application as the art will permit. Like reference characters denote like parts in the several figures of the drawing.

Referring now particularly to the drawing, the egg cooking cup 27 is formed, as by stamping, from relatively thin sheet metal of sufficient rigidity to maintain its shape during normal uses. The material preferably is of such nature and such thickness, however, as to permit bending or shaping of the handle portion of the cup as hereinafter described. One material which I have found suitable for forming the cup is aluminum.

The cup 27 has a bowl 10 of generally shallow, dished form and provided with a flat bottom 11, for a purpose which will hereinafter appear. The lower side portions 12 are curved and merge with the flat bottom 11 and with substantially vertical side walls 13 which are integral with a flat, horizontal, flange-like rim 14. The rim 14 preferably is polygonal in shape and I prefer that it be octagonal, the corners 15 providing points of support in certain cases for the cup upon various types of vessels, as will hereinafter more fully be explained.

Extending from the bowl 10, and preferably integral with the adjacent rim 14, is a handle which preferably is formed integral with one of the sides 16 of the rim portion 14. The handle is formed intermediate its ends with an upstanding U-shaped clip portion 17 having a generally inclined forward leg 18 merging into the rim 14, and a generally vertical rear leg 19.

The distal portion of the handle extends from the rear leg 19, preferably approximately in the plane of the rim 14, and provides a finger grip portion 20 for handling the cup. The finger-grip portion 20 may be of any desired shape, as for example, diamond shape, but should be sufficiently wide, at least at its central portion, to provide a good gripping area.

In order to stiffen the handle and to provide increased radiation surface, the handle is formed with a plurality, preferably two ridges or corrugations 22, extending from adjacent the rim 14 and continuing at 23 until they meet at the rearmost end of the finger grip portion 20, as indicated at 24. Additional cooling of the handle is provided by a perforation 21 which, in addition, cooperates with the ridges 22 to insure against the cup slipping out of the fingers. The perforation 21 may, if desired, be shaped to correspond with the shape of the finger grip portion 20 or, if desired, in manufacture, it may be simply a square or circular perforation.

The handle, while stiffened by the ridges 20, is nevertheless made of such material and of such thickness that it can, with not too great effort, be bent to conform to the shape of the rim and adjacent side walls of the vessel with which the cup is to be used. If it is desired to use the cup with a different vessel, the clip portion 17 can be readily reshaped by the user. The material should be such that the handle can be subjected to numerous slight bendings, without breaking, where the cup is to be used with various vessels.

The portion 17 is so shaped that the cup 27 is maintained substantially in horizontal position adjacent the rim of the vessel with which the cup is used. This not only prevents spilling of the egg, but also permits the cup to be entirely above the liquid in the vessel so that the egg is entirely cooked by steam. On the other hand, the suspending of the cup in a horizontal position permits the water level to stand nearly to the rim portion 16 of the cup without intermingling of the liquid and the egg in the cup; the rim may, if desired, be made somewhat wider than illustrated, in order to prevent any of the liquid in the vessel from bubbling up over the rim of the cup and into the interior.

The U-shaped portion or clip 17 extends above the plane of the rim portion 16. Therefore, when the cup is hooked on the rim of the vessel, the bowl 10 is just below the rim, thereby permitting a cover to be applied to the vessel, if desired. The handle is sufficiently thin and flat so that it does not interfere materially with the application of a cover to the vessel, regardless of whether the cover is one having an internal rim-like flange or an external flange or is made merely in the form of a disc.

Figure 5:
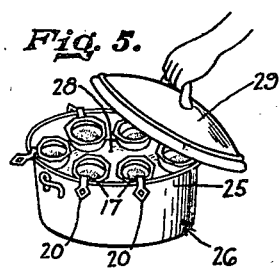
Fig. 5 is a somewhat diagrammatic reduced view in perspective showing one mode of use of a plurality of egg cooker cups constructed in accordance with the invention.
Figure 4:
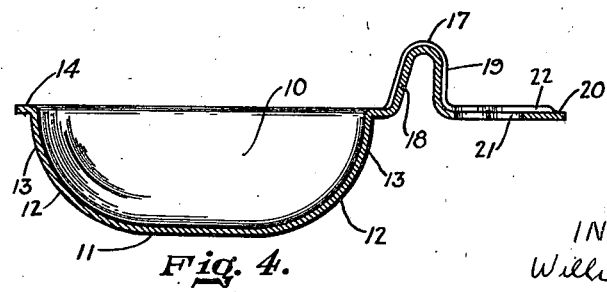
Fig. 4 is a vertical, cross-sectional view taken along the line 4—4 of Fig. 1.

In Fig. 5 of the drawing, a plurality of cups, made in accordance with the invention, are shown disposed in cooking position in a vessel 26 of the circular straight wall, saucepan type, having a cover 29. The cups are clipped on the rim or top edge of the side wall 25 and are maintained horizontally and at a level above the water 28 or cooking food in the vessel 26.

The cup of the present invention is suitable for use with vessels of innumerable shapes and dimensions regardless of whether they are generally circular or rectangular in shape. Moreover, since the cup has a flat bottom wall, it can be placed upon a tray or plate and will remain upright without the necessity for a rack or other support.

The handle, and particularly the finger grip portion, is formed for convenient manipulation of the cup. The handle being made of thin light material and having cooling ribs as well as a perforation, it does not generally become too hot to conveniently handle it. Moreover, since the finger grip portion extends outside of the vessel with which the cup is used, the person handling it does not have to insert his hand into the vessel or into the normal area of the vapors.

Owing to the light gauge of the metal from which the cup is constructed, it is possible to cook the egg very rapidly and in fact, it can be cooked by steam alone and need not be in contact with the liquid in the vessel.

The side 16 of the rim 14 extends chordally relatively to the wall of the vessel. Thus, the ends of the side provide with the leg 19 of the handle a three point engagement with the wall of the vessel. Accordingly, the cup is supported in a stable manner in the rim of the vessel.

It is generally preferable, for convenience and economy of manufacture, to form the cup by pressing or stamping it from sheet metal. However, where a heavier cup is desired, it may be formed by casting.

While certain novel features of the invention have been disclosed herein, and are pointed out in the annexed claims, it will be understood that various omissions, substitutions and changes may be made by those skilled in the art without departing from the spirit of the invention.

This application is a continuation-in-part of my copending application, Serial No. 158,825, filed August 13, 1937, now Patent No. 2,232,738, granted February 25, 1941.

What is claimed is:

1. An individual, egg-size cup for a steaming egg cooker, said cup being formed from relatively thin sheet metal and comprising an imperforate bowl and a sheet metal handle integral with and extending laterally from said bowl, said handle being formed intermediate its ends with an inverted U-shaped clip portion adapted to suspend the cup in a receptacle by engagement with the rim of the receptacle, and having a perforation formed in the distal portion of said handle and corrugations extending longitudinally of said handle and past said perforation.

2. An individual, egg-size cup for a steaming egg cooker, said cup being formed of thin metal and comprising a shallow imperforate bowl and a handle integral with and extending laterally from said bowl, said handle having intermediate its ends an inverted U-shaped clip for engaging the rim of a receptacle to suspend the cup in the receptacle, said clip being bendable to fit rims of various shapes, and a rim portion intermediate the handle and bowl and shaped to extend chordally within the receptacle whereby the ends of said rim portion provide with the handle a three point engagement with the receptacle.

WILLIAM F. SERR.